United States Patent
Iyer et al.

(10) Patent No.: US 11,921,900 B2
(45) Date of Patent: Mar. 5, 2024

(54) SYSTEM AND METHOD FOR SECURE MANAGEABILITY OF PRIVACY MODE

(71) Applicant: Dell Products L.P., Round Rock, TX (US)

(72) Inventors: Vivek Viswanathan Iyer, Austin, TX (US); Daniel Lawrence Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 375 days.

(21) Appl. No.: 17/185,255

(22) Filed: Feb. 25, 2021

(65) Prior Publication Data

US 2022/0269823 A1   Aug. 25, 2022

(51) Int. Cl.
| | |
|---|---|
| *G06F 21/00* | (2013.01) |
| *G06F 21/54* | (2013.01) |
| *G06F 21/62* | (2013.01) |
| *G06F 21/83* | (2013.01) |
| *G06F 21/84* | (2013.01) |

(52) U.S. Cl.
CPC .......... *G06F 21/6263* (2013.01); *G06F 21/54* (2013.01); *G06F 21/83* (2013.01); *G06F 21/84* (2013.01)

(58) Field of Classification Search
None
See application file for complete search history.

(56) References Cited

U.S. PATENT DOCUMENTS

| | | | | |
|---|---|---|---|---|
| 7,111,321 | B1* | 9/2006 | Watts, Jr. | G06F 21/34 709/224 |
| 7,540,013 | B2* | 5/2009 | Freund | G06F 21/57 709/225 |
| 8,527,013 | B2* | 9/2013 | Guba | H04W 4/027 455/418 |
| 9,077,583 | B2* | 7/2015 | Ghostine | H04L 67/00 |
| 9,697,365 | B2* | 7/2017 | Kohno | H04L 63/102 |
| 9,891,996 | B2* | 2/2018 | Gopal | G06F 11/1417 |
| 9,900,756 | B2* | 2/2018 | Trevathan | H04W 68/005 |
| 11,132,459 | B1* | 9/2021 | Lim | G06F 21/604 |
| 11,636,220 | B2* | 4/2023 | Swenson | G06F 16/2455 726/1 |
| 2009/0280795 | A1* | 11/2009 | O'Shaughnessy | H04M 3/42136 455/419 |
| 2011/0009107 | A1* | 1/2011 | Guba | G08G 1/20 455/418 |

(Continued)

*Primary Examiner* — Jeffery L Williams
(74) *Attorney, Agent, or Firm* — McDermott Will & Emery LLP

(57) ABSTRACT

Managing privacy controls in an information handling system to allow Information Technology Decision Makers (ITDMs) to prevent unwanted disclosure of information while allowing users to work together. A first privacy policy is asserted to protect information. When a user device requests an override to access an I/O device, embodiments analyze device parameters and application parameters to determine whether to authorize the use of the I/O device. If the override request is authorized, the user is able to access the I/O device and a new privacy policy is asserted. If a device parameter changes, embodiments may assess whether the change could result in unwanted disclosure of information and dynamically change the privacy policy to prevent the disclosure.

12 Claims, 4 Drawing Sheets

(56) References Cited

U.S. PATENT DOCUMENTS

| | | | | |
|---|---|---|---|---|
| 2014/0113593 | A1* | 4/2014 | Zhou | H04W 12/069 455/411 |
| 2015/0341391 | A1* | 11/2015 | Menon | H04L 67/535 726/1 |
| 2016/0316348 | A1* | 10/2016 | Trevathan | H04W 68/005 |
| 2016/0344604 | A1* | 11/2016 | Raleigh | H04L 43/0876 |
| 2017/0054760 | A1* | 2/2017 | Barton | H04L 63/0823 |
| 2017/0105122 | A1* | 4/2017 | Desai | H04L 67/025 |
| 2020/0107226 | A1* | 4/2020 | Raleigh | H04W 28/02 |
| 2020/0244704 | A1* | 7/2020 | Andrews | G06F 8/65 |
| 2021/0360016 | A1* | 11/2021 | Kaushal | H04L 41/069 |
| 2022/0043924 | A1* | 2/2022 | Hu | B60R 25/01 |
| 2022/0239578 | A1* | 7/2022 | Raleigh | H04L 65/80 |
| 2022/0269823 | A1* | 8/2022 | Iyer | G06F 21/6263 |
| 2022/0309170 | A1* | 9/2022 | Iyer | G06F 21/604 |
| 2022/0417284 | A1* | 12/2022 | Hamlin | H04L 63/20 |
| 2023/0053983 | A1* | 2/2023 | Osipov | G06F 9/547 |
| 2023/0058203 | A1* | 2/2023 | Osipov | G06F 9/547 |

* cited by examiner

SYSTEM AND METHOD FOR SECURE MANAGEABILITY OF PRIVACY MODE

BACKGROUND

Field of the Disclosure

The disclosure relates generally to maintaining secure protocols for an information handling system, and in particular, for setting and adjusting privacy settings for input and output device in the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems may implement hardened privacy controls for audio input (microphone), video input (camera) and display output (privacy screen).

SUMMARY

Embodiments disclosed herein may be generally directed to a computer-implemented method for dynamically managing privacy settings in an information handling system. The method may comprise a privacy manager service executing on an embedded controller (EC) asserting a first privacy policy including a first set of privacy rules for an input device or an output device in the information handling system (IHS). When an IHS service receives a privacy override request from a user interface, the IHS service determines a set of IHS parameters and a set of application parameters for the application and sends the privacy override request to a server service, the privacy override request including the set of IHS parameters and the set of application parameters. If the request is approved, the server service sends a response to the IHS service to allow the privacy override request. The IHS service receives the response from the server service, the response including a token and a second privacy policy including a second set of privacy rules. The IHS service sends the second privacy policy to the privacy manager service and the privacy manager service asserts the second privacy policy.

The first privacy policy may comprise a set of privacy rules for preventing use of a camera or a microphone, and the second privacy policy may comprise a set of privacy rules for allowing one or more of the camera or the microphone.

The first privacy policy may comprise a set of privacy rules for preventing use of a display or a speaker, and the second privacy policy may comprise a set of privacy rules for allowing use of the display or the speaker.

The privacy manager service may monitor the set of IHS parameters to determine a set of changed IHS parameters and send the set of changed IHS parameters to the server service. The server service may determine a third privacy policy based on to the set of changed IHS parameters and send the third privacy policy based on to the set of changed IHS parameters to the IHS service, wherein the IHS service may send the third privacy policy to the privacy manager service. The privacy manager service may assert the third privacy policy.

The first privacy policy may comprise a set of privacy rules for the IHS operating relative to a defined area and the set of changed IHS parameters may comprise a change in location of the IHS. The second privacy policy may comprise a set of privacy rules for the IHS operating at a different geographic location or outside the defined area.

The first privacy policy may comprise a set of privacy rules for the IHS operating relative to a defined time period or within a defined time range and the set of changed IHS parameters may comprise an indication that the time period has expired. The second privacy policy may comprise a set of privacy rules for the IHS operating at a different time period or outside the defined time range.

The privacy manager service may monitor the set of application parameters to determine a set of changed application parameters and send the set of changed application parameters to the server service. The server service may determine a new privacy policy based on the set of changed application parameters and send the new privacy policy based on the set of changed application parameters to the IHS service. The IHS service may send the new privacy policy to the privacy manager service and the privacy manager service may assert the new privacy policy.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
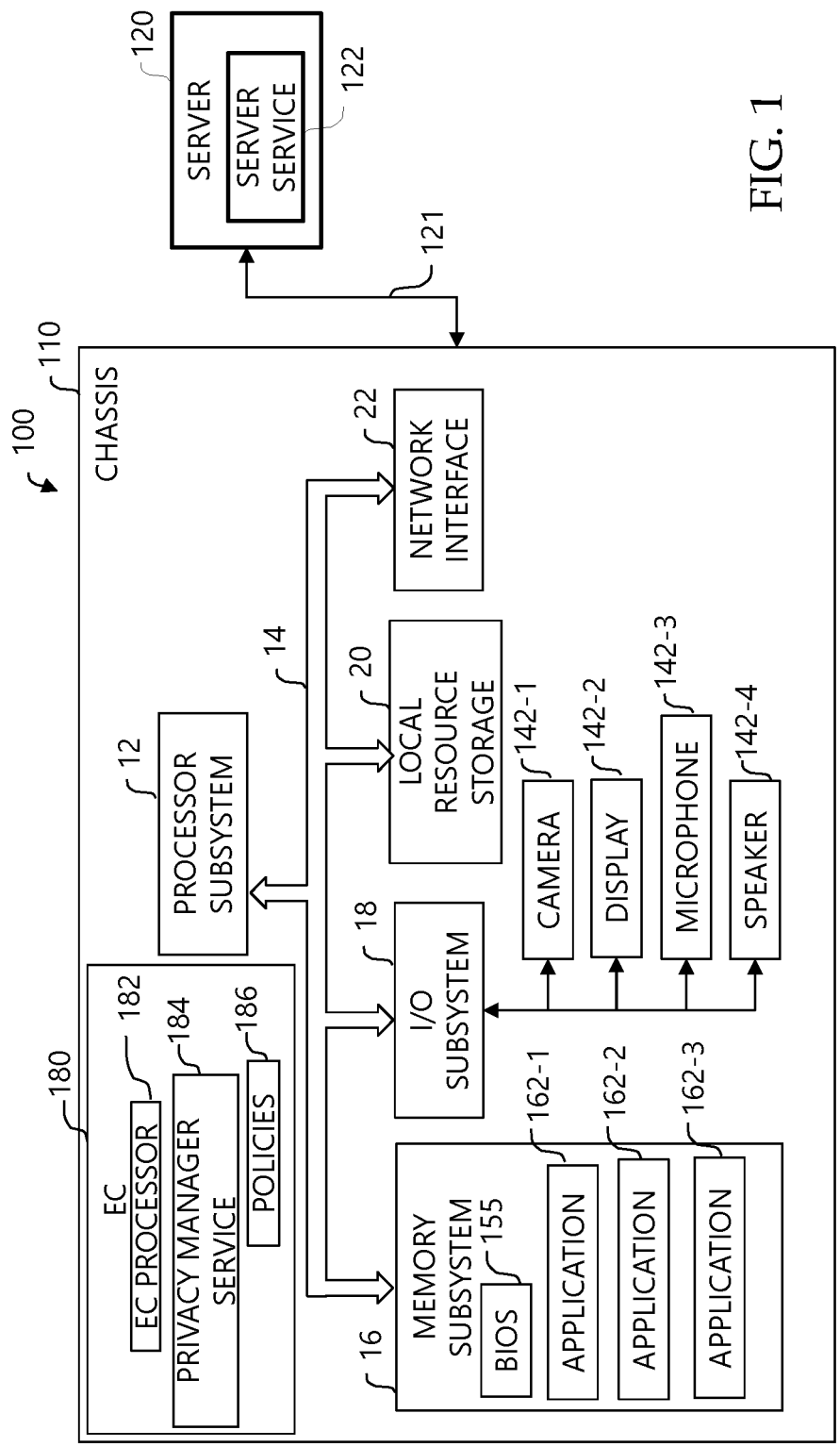
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 12, which may comprise one or more processors, and system bus 14 that communicatively couples various system components to processor subsystem 12 including, for example, a memory subsystem 16, an I/O subsystem 18, a local storage resource 20, and a network interface 22. System bus 14 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 12 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 12 may interpret and/or execute program instructions and/or process data stored locally (e.g., in memory subsystem 16 and/or another component of information handling system). In the same or alternative embodiments, processor subsystem 12 may interpret and/or execute program instructions and/or process data stored remotely.

Also in FIG. 1, memory subsystem 16 may comprise a system, device, or apparatus operable to retain and/or retrieve program instructions and/or data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Memory subsystem 16 may store applications 162 executable by processor subsystem 12. An application 162 may process information, such as a word processing application 162 or spreadsheet application 162. An application may be associated with an I/O device 142, such as a teleconferencing application 162. IHS 100 may execute multiple applications 162 in parallel, wherein a user may use a first application 162-1 to conduct a teleconference and use a second application 162-2 containing spreadsheets with data.

In information handling system 100, I/O subsystem 18 may comprise a system, device, or apparatus generally operable to receive and/or transmit data to/from/within information handling system 100. I/O subsystem 18 may represent, for example, a variety of communication interfaces, graphics interfaces, video interfaces, user input interfaces, and/or peripheral interfaces. In various embodiments, I/O subsystem 18 may be used to support various peripheral devices 142, such as camera 142-1, display 142-2, microphone 142-3 and speaker 142-4 as well as other peripheral devices 142 such as a keyboard, an accelerometer, a touch pad, a gyroscope, an IR sensor, a sensor, or another type of peripheral device.

Local storage resource 20 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 22 may be a suitable system, apparatus, or device operable to serve as an interface between information handling system 100 and a network 121. Network interface 22 may enable information handling system 100 to communicate over network 121 using a suitable transmission protocol and/or standard, including, but not limited to, transmission protocols and/or standards enumerated below with respect to the discussion of network 121. In some embodiments, network interface 22 may be communicatively coupled via network 121 to a server 120. Network 121 may be a public network or a private (e.g. corporate) network. The network 121 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 22 may enable wired and/or wireless communications (e.g., NFC or Bluetooth) to and/or from information handling system 100.

Network 121 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Users of information handling systems 100 may communicate with other users of information handling systems 100 to share ideas and collaborate on projects.

Privacy Policies

An information technology decision maker (ITDM) may establish privacy policies related to the use of IHS 100. A privacy policy may include one or more privacy rules that limit (including preventing) the use of an input device 142 or an output device 142 based on user device parameters or other criteria. Privacy rules may include, but are not limited to, privacy rules related to I/O subsystem 18 that prevent or limit any input devices 142 from capturing information or prevent or limit any output devices 142 from presenting information. A privacy policy may comprise a set of privacy rules to control access to an I/O device such as camera 142-1, display 142-2, microphone 142-3 and speaker 142-4.

Privacy Policy Rules Based on User Device Parameters

A privacy policy may include a privacy rule that limits (which may include preventing) IHS 100 from capturing information from an input device 142 based on user device parameters of IHS 100.

A privacy policy may include a privacy rule that limits IHS 100 from capturing information from an input device 142 unless one or more user device parameters meet privacy conditions. For example, a privacy rule may prevent IHS 100 from capturing information from camera 142-1 unless IHS 100 meets a privacy condition such as a background replacement is enabled, IHS 100 is at a location defined as a safe input area, or the number of people in the viewing area of IHS 100 is less than a specified number of people. A safe input area may be specifically defined by an ITDM and based on one or more criteria. A safe input area may be, for example, a physical location the ITDM has confirmed is not related to and does not contain or display confidential information.

A privacy policy may include a privacy rule that prevents IHS 100 from presenting information to an output device 142 unless one or more user device parameters meet privacy conditions. For example, a privacy rule may include a privacy rule that prevents IHS 100 from presenting information on display 142-2 unless IHS 100 is at a location identified as a safe output area. A privacy rule may allow IHS 100 to present limited information via an output device 142, such as allowing display 142-2 to present video only when IHS 100 is in a landscape configuration or allowing speaker 142-4 to broadcast at a volume less than a safe volume level (e.g., up to level 5 out of a possible 10 levels).

Other privacy rules may limit or prevent IHS 100 from capturing information from an input device but allow IHS 100 to present information to an output device 142. For example, a privacy rule may prevent camera 142-1 or microphone 142-3 from capturing information but allow display 142-2 or speaker 142-4 to present information.

Privacy Policy Rules Based on Application Parameters

Privacy policies 186 may allow or limit access to input and output devices based on parameters of application 162 executing on IHS 100.

A privacy policy 186 may include a privacy rule that limits (which may include preventing) IHS 100 from capturing information and presenting video information based on an application 162 executing on IHS 100.

A privacy policy 186 may include a privacy rule that allows IHS 100 to capture information from only selected input devices (e.g., microphone 142-3 can capture audio information, but camera 142-1 cannot capture video information) when an application 162 is executing on IHS 100.

A privacy policy 186 may include a privacy rule that prevents IHS 100 from capturing information from an input device 142 when an application 162 is executing on IHS 100 unless one or more application parameters meet specific conditions.

A privacy policy 186 may include a privacy rule that prevents IHS 100 from presenting information via speaker 148 at a volume greater than a safe volume when an application 162 is executing on IHS 100.

A privacy policy 186 may include a privacy rule that allows IHS 100 to present information to selected output devices (e.g., display 142-2 can present visual information, but speaker 142-4 cannot broadcast audio information) when an application 162 is executing on IHS 100.

A privacy policy 186 may include a privacy rule that limits IHS 100 from presenting information via one or more output devices 142 based on a combination of user device parameters and application parameters. For example, a privacy rule may allow IHS 100 to present information to selected output devices (e.g., IHS 100 may present visual information on display 142-2 but not broadcast audio information via speaker 142-4) when an application 162 is executing on IHS 100 and only one person is detected near IHS 100.

A privacy policy 186 may include a privacy rule based on device parameters and application parameters. For example, a privacy rule may limit the volume of speakers 142-4 when an application 162 is executing on IHS 100 and IHS 100 is outside of a designated area.

Privacy Policies can Limit Productivity and Inhibit Collaboration

Although privacy policies may be necessary to prevent unwanted disclosure of confidential information, the actual implementation and enforcement of privacy policies can limit productivity and prevent collaboration.

For example, a user may be working from home with an information handling system 100 provided by an employer. An ITDM may have established a privacy policy 186 with a privacy rule preventing IHS 100 from capturing information using camera 142-1 or microphone 142-3 when IHS 100 is not physically located at the employer location. In this scenario, the user is prevented from setting up an ad-hoc teleconference (with video and audio functions) at his home.

As another example, an ITDM may implement a privacy policy with privacy rules to allow users to conduct video calls on IHS 100 only in specific locations determined to be "video input safe", but only if there is a single user in the field of view. For the user to take advantage of this policy, the user must continually monitor the surroundings and manually turn on/off camera 142-1 or display 142-2.

As another example, an ITDM may implement a privacy policy with rules to allow for users to conduct video calls lasting a maximum of X minutes of a Y meeting notice in specific locations with IHS 100 configured with background replacement enabled. If a user needs more time to conduct the meeting, the user must get approval and perform manual steps before, during and after the meeting to avoid violating the IT policy.

As another example, a user may be in a meeting and manually disable privacy protection. If the user exits the meeting and takes IHS 100 back to a desk before enabling the privacy protection, camera 142-1 and microphone 142-3 may still be enabled, posing a security risk.

As another example, a user may be working at a desk and manually disable privacy protection. If the user then takes IHS 100 into a high security lab in which confidential information is visible and starts a teleconference before enabling the privacy protection, the confidential information may be seen by an outside party, posing a security risk.

Each of these examples highlight risks associated with privacy policies that require the user to manually adjust settings, continually monitor their surroundings, and adjust the settings while conforming to IT privacy policies.

To overcome these obstacles and allow users to work together, embodiments include systems and methods to allow users to request overrides of privacy policies but allow system managers to protect confidential information.

Overriding Privacy Policies

Figure 2:
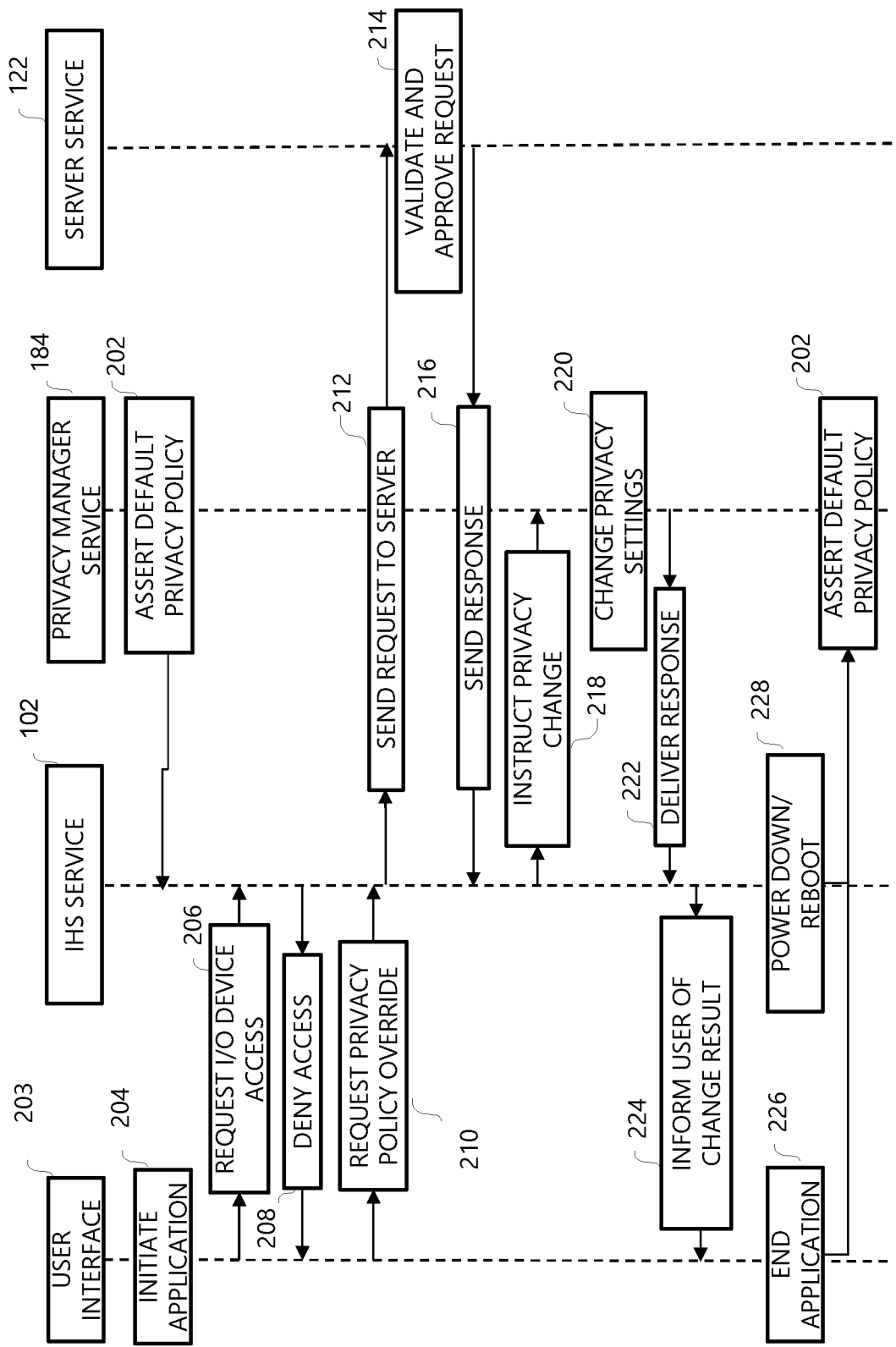
FIG. 2 illustrates a sequence diagram for dynamically managing input and output device settings for an information handling system according to one or more privacy policies.

FIG. 2 illustrates a sequence diagram 200 for dynamically managing input and output device settings for an information handling system 100 according to one or more privacy policies.

At step 202, a privacy manager service 184 asserts a first privacy policy 186 on information handling system 100. In some embodiments, EC processor 182 executing privacy manager service 184 communicates with IHS service 102 to indicate which I/O devices 142 are affected by the first privacy policy 186. In other embodiments, EC processor 182 communicates through I/O subsystem 140 to disable the functions of selected I/O devices 142.

At step 204, IHS service 102 may receive a request via user interface 203 to initiate an application 162 on IHS 100.

At step 206, application 162 may request I/O device access. In some embodiments, application 162 may automatically send a request for I/O device access when initiated. For example, a user may initiate application 162-1 to conduct a teleconference and application 162-1 may automatically send a request to access camera 142-1, display 142-2, microphone 142-3 and speaker 142-4. In some scenarios, a user may be using application 162 executing on IHS 100 and manually request I/O device access by clicking an option to access camera 142-1, display 142-2, microphone 142-3 or speaker 142-4.

At step 208, IHS service 102 may determine, from one or more flags or settings, that privacy policy 186 prevents access to an I/O device 142 and IHS service 102 may respond to the user request by denying the request. The response may include a privacy policy 186 or privacy rule for why the request was denied. In some embodiments, the response may include an activatable option that the user can select to request an override of the policy rule or the privacy policy 186.

At step 210, IHS service 102 may receive a policy override request from user interface 203 to override one or more rules of the privacy policy 186.

At step 212, IHS service 102 may determine a set of user device parameters for IHS 100 and a set of application parameters for application 162 executing on IHS 100 and send the privacy override request to a server service 122. The set of user device parameters may include, for example, a location of IHS 100, a number of people in the vicinity of IHS 100, an ambient light level, an ambient noise level, a network connection, or some user device parameter that may be used to determine if IHS 100 is susceptible to unwanted disclosure of information. The set of application parameters may include, for example, instructions requesting camera access, microphone access, access to files stored on IHS 100, access to a network interface, or some other application parameter that may indicate the application 162 is capable of capturing or disclosing information. IHS service 102 may send the policy override request with the IHS parameters and the application parameters to server service 122. The policy override request may specify a location, an application 162, a time duration, an I/O device 142 for which application 162 wants access, a number of people authorized to view or hear the information or a list of people authorized to view or hear the information, for example.

At step 214, server service 122 receives the policy override request, the set of IHS parameters and the set of application parameters from IHS service 102 and determines whether to allow or deny the policy override request. In some embodiments, server service 122 validates, based on the set of IHS parameters or the set of application parameters, that the risk to unwanted disclosure of information is acceptable. For example, server service 122 may analyze the set of IHS parameters and determine IHS 100 is in a location or configuration such that application parameters the risk to unwanted disclosure of information is acceptable or may analyze the set of application parameters and determine that the application 162 is not requesting access to I/O devices 142 that could risk unwanted disclosure of information or requesting access to critical or sensitive information.

At step 216, server service 122 sends a response to the policy override request to IHS service 102. In some embodiments, the response specifies one or more I/O devices 142 and any conditions for their use. For example, a response may specify a maximum duration that camera 142-1 can be used for a meeting as a condition for allowing the use of camera 142-1. Other conditions may include, for example, that a background replacement be presented when camera 142-1 is in use, that the user device remain in the same location, that microphone 142-3 records at a lower setting to reduce the likelihood that background conversations are also recorded, or that speaker volume be less than a specified level to prevent other users from hearing information. In some embodiments, server service 122 sends a new privacy policy 186 with a set of privacy rules that correspond to the device parameters and application parameters. In some embodiments, a response includes a token, wherein the token expires after a specified time.

When IHS service 102 receives the response, IHS service 102 is able to implement changes based on the new privacy policy, allowing a user or an application 162 to access an I/O device 142 according to the new privacy policy. In some embodiments, IHS service 102 uses the token to access the I/O device 142.

At step 218, IHS service 102 communicates with privacy manager service 184 to change privacy settings based on the new privacy policy 186. The new privacy settings may be stored in memory accessible by privacy manager service 184. In some embodiments, the new privacy settings are stored in memory subsystem 16 such that, when IHS 100 powers down or reboots, the new privacy settings are deleted or removed from memory subsystem 16. In some embodiments, the new privacy settings may be stored in memory subsystem 16 such that, in a future scenario having the same device parameters and the same application parameters, the new privacy settings may be implemented by IHS 100 automatically requesting a privacy policy override. In some embodiments, the new privacy settings may be stored in memory subsystem 16 such that, in a future scenario having the same device parameters and the same application parameters, IHS 100 may prompt the user if the user would like to request a privacy policy override.

At step 220, privacy manager service 184 asserts the new privacy policy 186. Asserting the new privacy policy may include asserting new parameters for use of I/O devices 142 or new parameters for IHS 100 or application 162. For example, privacy manager service 184 may set a new location parameter for IHS 100. Thus, if at step 216 server service 122 allows a policy override request to use camera 142-1, privacy manager service 184 may assert a privacy policy 186 with a set of privacy rules that limit how far IHS 100 may be moved before access to camera 142-1 is terminated.

At step 222, Privacy manager service 184 delivers a response to IHS service 102. The response may include information about one or more IHS parameters or application parameters to monitor. For example, if a new privacy policy includes a privacy rule affected by location of IHS 100, a response from Privacy manager service 184 to IHS service 102 may indicate IHS service should monitor IHS 100 for changes in location. Examples of other parameters may include ambient lighting, ambient noise, face detection and electronic files or folders.

At step 224, IHS service 102 communicates with user interface 203 to inform the user of the change result. For example, the user may have requested use of camera 142-1 for a teleconference. IHS service 102 may communicate with user interface 203 to inform the user that the use of camera 142-1 is approved for up to 30 minutes based on guidelines set by an ITDM. In some embodiments, the user is informed of what privacy rules were overridden and on what conditions the new privacy rules depend.

Steps 202-224 may be performed each time a user requests an override of a privacy policy. The user device may continue to process instructions and allow the user to collaborate with other users according to the conditions of the second privacy policy.

When the need for collaboration is over, such as the user closing the application at step 226 or powering down the user device at step 228, Privacy manager service 184 may assert the first privacy policy (at step 202).

Dynamically Adjusting Privacy Policies

Figure 3:
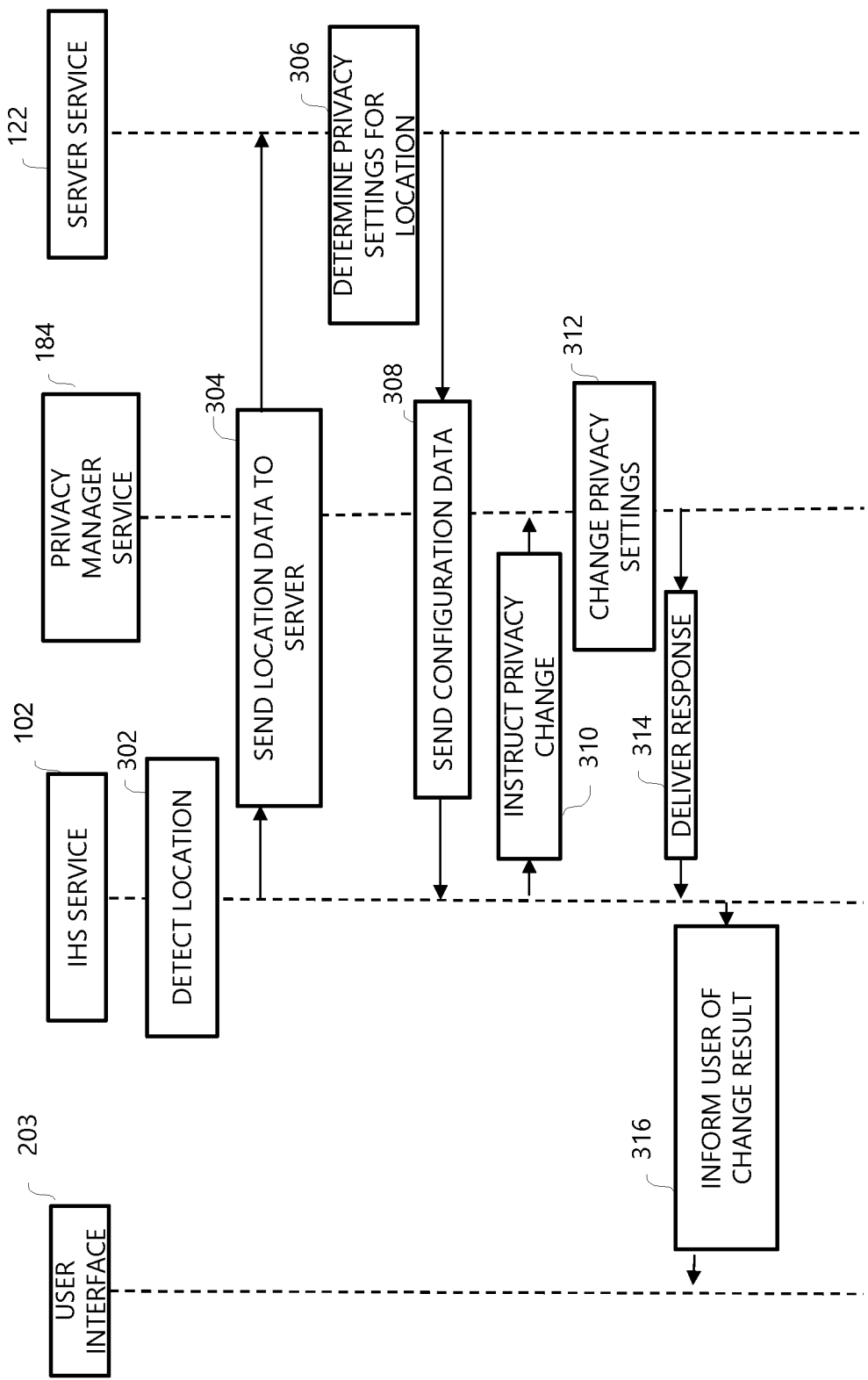
FIG. 3 illustrates a sequence diagram for dynamically managing input and output device settings for an information handling system based on a change in a device parameter or an application parameter.

In some situations, one or more user device parameters or application parameters will change, which could result in a violation of a privacy policy 186. FIG. 3 illustrates a sequence diagram for dynamically managing input and output device settings for an information handling system 100 based on a change in a device parameter or an application parameter.

Referring to FIG. 3, IHS 100 may be operating according to a first privacy policy 186 with one or more privacy rules that define a set of parameters. The set of parameters may include IHS parameters such as a location or area, an ambient light level or an ambient noise level in which IHS 100 may use a camera 142-1. The set of parameters may include application parameters specifying requirements when application 162 is being executed by IHS 100.

At step 302, IHS service 102 may monitor IHS parameters and application parameters to determine a change in at least one set of parameters. For example, IHS service 102 may analyze GPS information or signals from an accelerometer (not shown) and determine IHS 100 is moving away from an area in which camera access was allowed according to a privacy policy 186.

At step 304, if IHS service 102 determines a change in either the set of user device parameters or the set of application parameters, IHS service 102 may communicate the information to server service 122, along with the changed set of parameters. For example, IHS service 102 may communicate a change in GPS coordinates based on detecting IHS 100 is moving away from a location in which access to camera 142-1 is allowed.

At step 306, server service 122 receives the communication with the changed set of parameters and determines the privacy settings for the changed set of parameters.

If the changed set of parameters do not meet one or more privacy rules of the privacy policy 186, then at step 308, server service 122 communicates a response to IHS service 102 with configuration data. In some embodiments, the configuration data comprises a new privacy policy 186 to be asserted. The new privacy policy may be a default privacy policy that blocks access to all I/O device 142 or may comprise one or more privacy rules specific to the changed set of parameters.

IHS service 102 receives the configuration data and configures IHS 100 accordingly. For example, the configuration data may specify camera 142-1 should be turned off and IHS service 102 may send a signal to camera 142-1 to stop recording.

At step 310, IHS service communicates with privacy manager service 184 to instruct privacy changes to IHS 100. A privacy setting may specify an IHS parameter or an application parameter. An IHS parameter may include a parameter of an I/O device 142 such as a maximum volume level of speakers 142-4, a sensitivity of microphone 142-3 or a brightness of display 142-2. An IHS parameter may also include a location of IHS 100 or an ambient light level. An application parameter may specify an application 162 subject to a privacy policy 186. An application parameter may limit the size of any files accessible by application 162. An application parameter may limit or prevent access to files by an application 162.

At step 312, Privacy manager service 184 receives the communication from IHS service 102 and changes the privacy settings.

At step 314, Privacy manager service 184 delivers a response to IHS service 102.

At step 316, IHS service 102 communicates with user interface 203 to inform the user of the change result. For example, the user may have originally requested use of camera 142-1 for a teleconference in a safe input location but may have subsequently moved IHS 100 to another area that is unsecure. IHS service 102 may inform the user that the use of camera 142-1 is no longer approved based on guidelines set by an ITDM. In some embodiments, the user is informed of what privacy rules have been reinstated and on what conditions the new privacy rules depend.

At step 318, when the user stops execution of the application 162 or IHS 100 is powered down, privacy manager service 184 may change all privacy rules to a default privacy policy 186 to prevent unwanted disclosure of information.

Embodiments can manage I/O device settings in accordance with established ITDM privacy policies to allow users more opportunities to collaborate in various environments without manually managing I/O devices of information handling system 100. Eliminating the need for users to manually update I/O device settings may allow increased productivity of the user and facilitate collaboration between users while maintaining established privacy controls of information.

Figure 4:
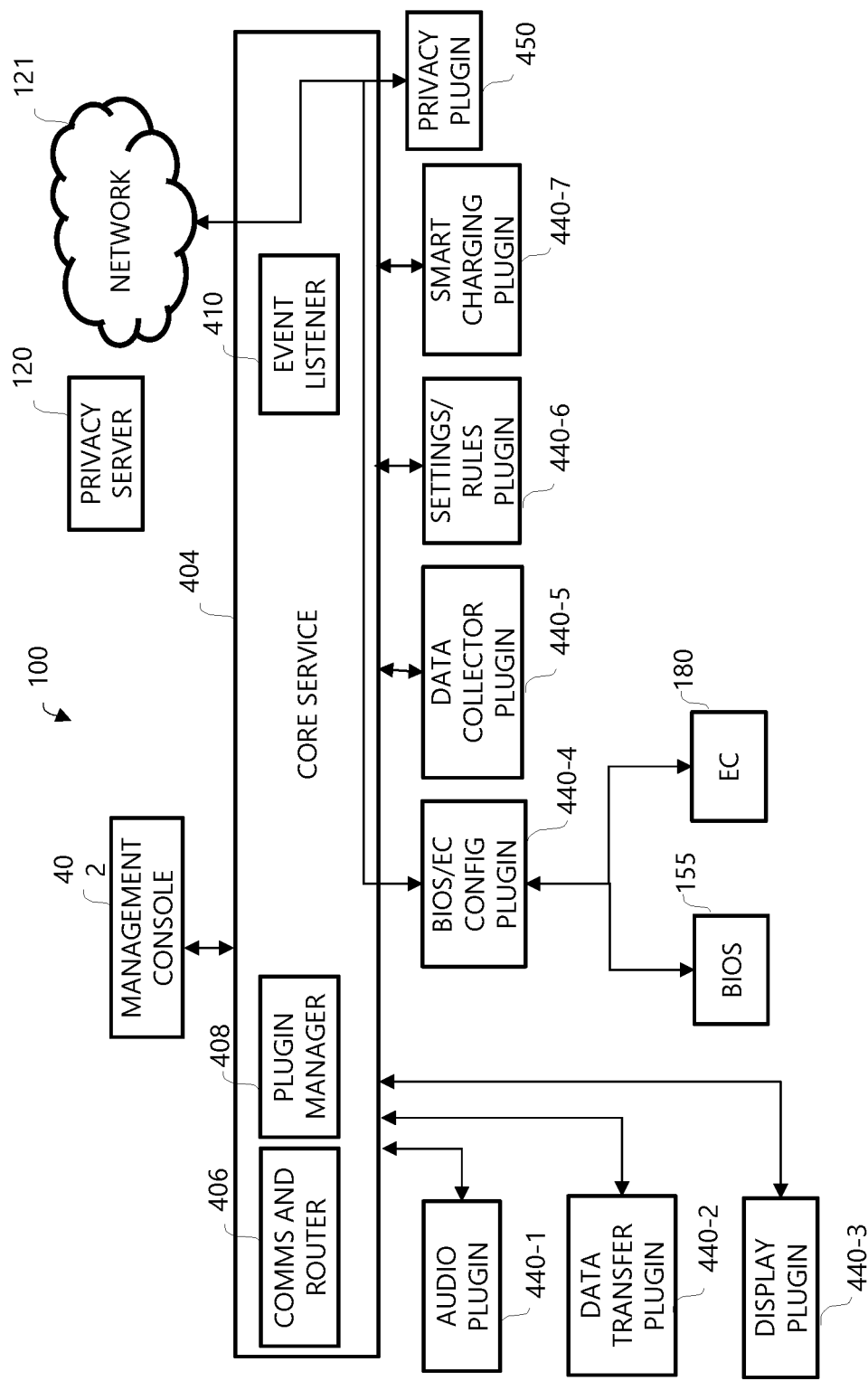
FIG. 4 illustrates a system architecture block diagram of an embodiment of a system for managing device settings in an information handling system.

FIG. 4 illustrates a system architecture block diagram of an embodiment of a system 400 for managing device settings in an information handling system 100 based on privacy policies, user device parameters and application parameters.

Information handling systems 100 may include management consoles 402, core service 404 with communications and router 406, plugin manager 408 and event listener 410. Core service 404 may be coupled to one or more operating system (OS) native components, third party developed plugins (e.g., audio plugin 440-1, data transfer plugin 440-2 and display plugin 440-3), and IHS-specific plugins (e.g., BIOS/EC configuration login 440-4, data collector plugin 440-5, settings/rules plugin 440-6, and smart charging plugin 440-7). Each plugin 440 may extend the capabilities of IHS 100 but may also allow unwanted disclosure of information.

Privacy plugin 450 may communicate over network 121 with privacy server 120 to receive a set of privacy policies 186. Privacy plugin 450 may communicate a privacy policy 186 to BIOS/EC plugin 440-4, which is in communication with BIOS 155 and EC 180. EC 180 may store the set of privacy policies in a memory accessible by EC processor 182. Privacy plugin 450 may communicate with BIOS/EC plugin 440-4 to implement privacy controls on plugins 440 to prevent unwanted disclosure of information via I/O devices 142.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for dynamically managing privacy settings in an information handling system (IHS), the method comprising:
   a privacy manager service asserting a first privacy policy including a first set of privacy rules for one or more of an input device and an output device based on an environment in which the IHS is operating, the first set of privacy rules including a defined geographic area;
   an IHS service receiving a privacy override request;
   the IHS service determining, at a first time, a set of IHS parameters and a set of application parameters for the application based on the environment, the IHS parameters including a first geographic location of the IHS;
   the IHS service sending the privacy override request to a server service, the privacy override request including the set of IHS parameters and the set of application parameters;
   the server service, based on the first geographic location of the IHS, sending a response to the IHS service to allow the privacy override request, the response including a token and a second privacy policy including a second set of privacy rules;
   the IHS service receiving the response from the server service;
   the IHS service sending the second privacy policy to the privacy manager service;
   the privacy manager service asserting the second privacy policy;
   the IHS service determining, at a second time after the first time, a change from the first geographic location to a second geographic location;
   the IHS service sending data including the second geographic location of the IHS to the server service;
   the privacy manager, based on the second geographic location of the IHS, determining that the second geographic location does not meet the second set of privacy rules of the second privacy policy;

the privacy manager sending a default privacy policy to the IHS service, the default privacy policy blocking access to the one or more of the input device and the output device; and asserting, by the privacy manager service, the default privacy policy.

2. The computer-implemented method of claim 1, wherein:
the first privacy policy comprises a first set of privacy rules for preventing use of a camera or a microphone based on the environment, and
the second privacy policy comprises a second set of privacy rules for allowing one or more of the camera or the microphone in the environment.

3. The computer-implemented method of claim 1, wherein:
the first privacy policy comprises a first set of privacy rules for preventing use of a display or a speaker based on the environment, and
the second privacy policy comprises a second set of privacy rules for allowing use of the display or the speaker in the environment.

4. The computer-implemented method of claim 1, wherein:
the first privacy policy comprises one or more privacy rules for the IHS operating relative to a defined time period associated with the environment;
the set of changed IHS parameters comprises a time outside the time period; and
the second privacy policy comprises one or more privacy rules for the IHS operating at a different time period.

5. The computer-implemented method of claim 1, further comprising:
the privacy manager service monitoring the set of application parameters to determine a set of changed application parameters;
the privacy manager service sending the set of changed application parameters to the server service;
the server service determining a new privacy policy based on to the set of changed application parameters;
the server service sending the new privacy policy to the IHS service based on to the set of changed application parameters;
the IHS service sending the new privacy policy to the privacy manager service; and
the privacy manager service asserting the new privacy policy.

6. The computer-implemented method of claim 5, wherein:
the first privacy policy comprises a set of privacy rules for the application that do not include using one of a camera or a microphone, and
the new privacy policy comprises a set of privacy rules for the application that include using one or more of the camera or the microphone.

7. The computer-implemented method of claim 5, wherein:
the first privacy policy comprises a set of privacy rules for the application that do not include using one of a display or a speaker, and
the new privacy policy comprises a set of privacy rules for the application that include using one or more of the display or the speaker.

8. An information handling system (IHS) comprising:
one or more devices for receiving audio or video user input;
one or more devices for communicating audio or video output;
an embedded controller (EC) comprising an EC processor having access to an EC memory storing a privacy manager service configured to assert a privacy policy including privacy rules for preventing computer-implemented actions associated with one or more of an input device and an output device based on an environment in which the IHS is operating; and
an IHS processor having access to an IHS memory storing instructions executable by the IHS processor to:
initiate an application;
in response to receiving a request from the user to override the privacy policy:
determine, at a first time, a set of IHS parameters and a set of application parameters for the application, the IHS parameters including a first geographic location of the IHS;
send the request to a server executing a server service, the request including the set of IHS parameters and the set of application parameters;
in response to receiving a response from the server service, the response including a token and a second privacy policy, send the second privacy policy to the privacy manager service, the second privacy policy comprising a set of privacy rules for allowing computer-implemented actions associated with one or more of the input device and the output device based on the environment;
determine, at a second time after the first time, a change from the first geographic location to a second geographic location;
send data including the second geographic location of the IHS to the server service;
in response to sending the data, receive a response from the server service including a default privacy policy based on the second geographic location not meeting the set of privacy rules of the second privacy policy, the default privacy blocking access to the one or more of the input device and the output device,
wherein the privacy manager service is configured to assert the second default privacy policy.

9. The information handling system of claim 8, wherein:
the first privacy policy comprises a set of privacy rules for preventing use of a camera or a microphone as the input device based on the environment, and
the second privacy policy comprises a set of privacy rules for allowing one or more of the camera or the microphone in the environment.

10. The information handling system of claim 8, wherein:
the first privacy policy comprises a set of privacy rules for preventing use of a display or a speaker as the output device based on the environment, and
the second privacy policy comprises a set of privacy rules for allowing use of the display or the speaker in the environment.

11. The information handling system of claim 8, wherein:
the first privacy policy comprises one or more privacy rules for the IHS operating relative to a defined time period associated with the environment;
the set of changed IHS parameters comprises a time outside the time period; and
the second privacy policy comprises one or more privacy rules for the IHS operating at a different time period.

12. The information handling system of claim 8, wherein:
the privacy manager service is configured to monitor the set of application parameters to determine a set of changed application parameters and send the set of changed application parameters to the server service;
the server service is configured to determine a new privacy policy based on to the set of changed application parameters and send the new privacy policy to the IHS service; and
the IHS service is configured to send the new privacy policy to the privacy manager service, wherein the privacy manager service is configured to assert the new privacy policy.

* * * * *